US011811577B2

(12) United States Patent
Dehmas

(10) Patent No.: US 11,811,577 B2
(45) Date of Patent: Nov. 7, 2023

(54) METHOD FOR ESTIMATING CHARACTERISTICS OF AN IMPULSE RADIO ULTRA-WIDEBAND SIGNAL TRANSMITTED BY A PLURALITY OF ANTENNAS

(71) Applicant: COMMISSARIAT A L'ENERGIE ATOMIQUE ET AUX ENERGIES ALTERNATIVES, Paris (FR)

(72) Inventor: François Dehmas, Grenoble (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 0 days.

(21) Appl. No.: 17/838,189

(22) Filed: Jun. 11, 2022

(65) Prior Publication Data
US 2022/0407765 A1    Dec. 22, 2022

(30) Foreign Application Priority Data

Jun. 18, 2021    (FR) .................................... 2106468

(51) Int. Cl.
*H04L 27/26*    (2006.01)
*G01S 3/48*    (2006.01)

(52) U.S. Cl.
CPC ............ *H04L 27/2666* (2013.01); *G01S 3/48* (2013.01); *H04L 27/2646* (2013.01)

(58) Field of Classification Search
CPC .... H04L 27/2666; H04L 27/2646; G01S 3/48
See application file for complete search history.

(56) References Cited

U.S. PATENT DOCUMENTS

| 9,048,979 | B2 | 6/2015 | Park et al. | |
|---|---|---|---|---|
| 9,048,980 | B2 | 6/2015 | Park et al. | |
| 2017/0227623 | A1 | 8/2017 | Park et al. | |
| 2018/0254870 | A1 | 9/2018 | Dutz et al. | |
| 2019/0331783 | A1* | 10/2019 | McLaughlin | ....... G01S 13/0209 |
| 2020/0252101 | A1* | 8/2020 | McLaughlin | ............ G01S 5/12 |
| 2020/0264257 | A1* | 8/2020 | Stitt | ..................... G01S 5/0284 |
| 2021/0396832 | A1* | 12/2021 | McLaughlin | ............ G01S 1/08 |
| 2022/0397629 | A1* | 12/2022 | McLaughlin | ........ H04B 7/0602 |

* cited by examiner

*Primary Examiner* — Jaison Joseph
(74) *Attorney, Agent, or Firm* — BakerHostetler

(57) ABSTRACT

A method is provided for estimating at least one characteristic of a signal received by a receiver, the signal having been transmitted in succession by a plurality of antennas in successive time segments, each segment being dedicated to one separate antenna, the signal being modulated into the form of pulses according to ultra-wideband modulation. The method includes steps of: receiving and digitizing the signal, computing the product of multiplication of each symbol of the received signal by the complex conjugate of the corresponding transmitted symbol, for each segment and for each symbol of the signal received for this segment, estimating a phase error by means of a phase-locked loop applied to the product, for each segment, determining a reference phase by means of a linear regression applied to the phase errors estimated for all of the segments, determining, for at least one pair of antennas, a phase difference between the signals transmitted by the antennas of the pair, on the basis of the difference between the reference phases computed for the segments associated with the antennas.

9 Claims, 6 Drawing Sheets

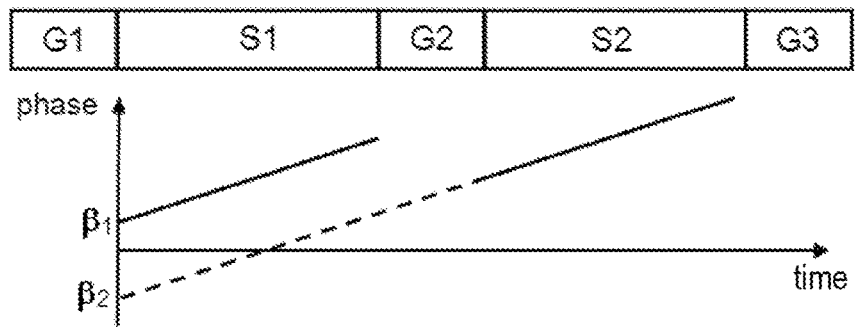
FIG.1
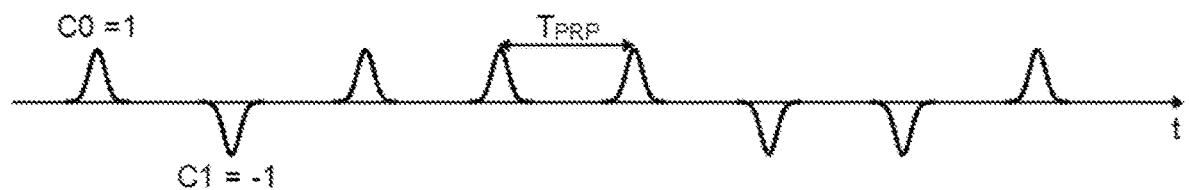
FIG.2
FIG.3

METHOD FOR ESTIMATING CHARACTERISTICS OF AN IMPULSE RADIO ULTRA-WIDEBAND SIGNAL TRANSMITTED BY A PLURALITY OF ANTENNAS

CROSS-REFERENCE TO RELATED APPLICATION

This application claims priority to foreign French patent application No. FR 2106468, filed on Jun. 18, 2021, the disclosure of which is incorporated by reference in its entirety.

FIELD OF THE INVENTION

The invention relates to the field of impulse radio ultra-wideband communication systems, i.e. to communication systems in which the signals are modulated into the form of pulses of very short duration.

More precisely, the invention relates to systems in which a plurality of antennas are used transmission end and regards a method for estimating phase offsets between the received signals originating from various antennas. The phase offsets thus estimated allow phase differences to be computed, then the angular direction of transmission of the signal to be estimated. One application of the invention relates to location of a transmitter or measurement of the distance between a transmitter and a receiver.

BACKGROUND

Estimation of phase offsets also allows the demodulation of the signals to be improved.

The method also regards estimation of a carrier frequency offset between a receiver and a transmitter and estimation of an impulse response of the propagation channel.

In the field of radiocommunication systems, the signals received in baseband by receivers are distorted by multiple defects related to desynchronizations between the transmitter and receiver or to the propagation conditions of the signals. Specifically, in practice, reception conditions are never ideal.

More precisely, a carrier frequency offset appears between the received signal and the transmitted signal when the respective local oscillators of the transmitter and of the receiver are not synchronized.

In the case where the transmitter comprises a plurality of antennas transmission end, a phase offset specific to each antenna also exists between the received signal and the transmitted signal, because of the different propagation times between each transmitting antenna and the receiving antenna.

These phase offsets must be compensated for to ensure a good demodulation performance is obtained, but they may also be used to estimate an angular direction of the transmitted signal.

Moreover, ultra-wideband communication systems are subject to distortion related to multiple reflections of the signal from obstacles in the environment. Because signals travelling multiple paths are received simultaneously, this distortion manifests itself in inter-symbol interference affecting the received signals.

One technical problem to be solved in this context is that of estimating the phase offsets between the received signals originating from various antennas of a multi-antenna transmitter, but also of estimating the carrier frequency offset and the impulse response of the propagation channel.

Patent application US 20200252101 describes a method for determining an angular direction for ultra-wideband communication systems that is based on a direct estimation of the starting angles of the signals originating from each antenna. This document does not describe a method allowing the phase differences between signals originating from various transmitting antennas to be estimated reception end.

Patent documents US2017/0227623, U.S. Pat. Nos. 9,048, 979 and 9,048,980 describe methods for synchronizing phase and frequency for ultra-wideband systems. These documents propose methods for estimating phase and frequency that are based on a correlation between the square of the I reception channel and of the Q reception channel. These methods have the drawback of being ineffective at low signal-to-noise ratios because of the squaring of the signals reception end.

SUMMARY OF THE INVENTION

The invention provides a new method for estimating phase and frequency offsets for ultra-wideband communication systems in which the transmitters comprise a plurality of antennas.

One advantage of the invention is that it has a good estimation performance even at low signal-to-noise ratios.

One subject of the invention is a method for estimating at least one characteristic of a signal received by a receiver, the signal having been transmitted in succession by a plurality of antennas in successive time segments, each segment being dedicated to one separate antenna, the signal being modulated into the form of pulses according to ultra-wideband modulation, the method comprising steps of:
  receiving and digitizing said signal,
  computing the product of multiplication of each symbol of the received signal by the complex conjugate of the corresponding transmitted symbol,
  for each segment and for each symbol of the signal received for this segment, estimating a phase error by means of a phase-locked loop applied to said product,
  for each segment, determining a reference phase by means of a linear regression applied to the phase errors estimated for all of the segments, determining, for at least one pair of antennas, a phase difference between the signals transmitted by the antennas of the pair, on the basis of the difference between the reference phases computed for the segments associated with said antennas.

According to one particular aspect of the invention, conjointly with the determination of the phase difference, a carrier frequency offset between the signal transmitted by all of the antennas and the received signal is determined by means of said linear regression applied to the phase errors estimated for all of the segments.

According to one particular aspect of the invention, the successive time segments are separated by guard intervals and the method further comprises removing these guard intervals from the received and digitized signal.

According to one particular embodiment, the method further comprises a step of determining an angular direction of transmission of the signal on the basis of said phase differences.

According to one particular embodiment, the method further comprises steps of:

correcting each symbol of the received signal for the computed phase error by means of the phase-locked loop, estimating an impulse response of the propagation channel by means of a computation of an intercorrelation between the sequence of the corrected received symbols and a sequence of the symbols transmitted in the segments.

According to one particular embodiment, the method comprises beforehand an initial synchronizing phase specific to each segment comprising steps of:

determining, in a preamble sequence prior to the first segment, a first estimation of a carrier frequency offset between the received signal and the digitized signal, correcting the digitized received signal using this first estimation, estimating, for the start of each segment, an impulse response of the propagation channel by means of a computation of an intercorrelation between a sequence of corrected received symbols and a sequence of the corresponding transmitted symbols, determining, on the basis of the impulse response estimated for the start of each segment, a symbol corresponding to the start of the segment.

According to one particular aspect of the invention, the signal is according to the standard IEEE 802.15.4z.

According to one particular aspect of the invention, the sequences of symbols transmitted in the time segments are secured by means of an encryption algorithm.

Another subject of the invention is a receiver of a signal modulated into the form of pulses according to ultra-wideband modulation, said receiver comprising an antenna and a computer configured to execute the steps of the method for estimating at least one characteristic of the received signal according to the invention.

Yet another subject of the invention is a communication system comprising a transmitter of a signal modulated into the form of pulses according to ultra-wideband modulation comprising a plurality of antennas, the signal being transmitted in succession by a plurality of antennas in successive time segments, each segment being dedicated to one separate antenna, the system further comprising a receiver according to the invention.

BRIEF DESCRIPTION OF THE DRAWINGS

Other features and advantages of the present invention will become more clearly apparent on reading the following description with reference to the following appended drawings.

FIG. 1 shows a theoretical diagram of the variation of the phase of an ultra-wideband signal transmitted by two antennas and received by one antenna, FIG. 2 shows a plurality of examples of the configuration of frames formatted according to the standard IEEE 802.15.4z, FIG. 3 shows one example of an impulse radio ultra-wideband signal.

DETAILED DESCRIPTION

Figure 4A:
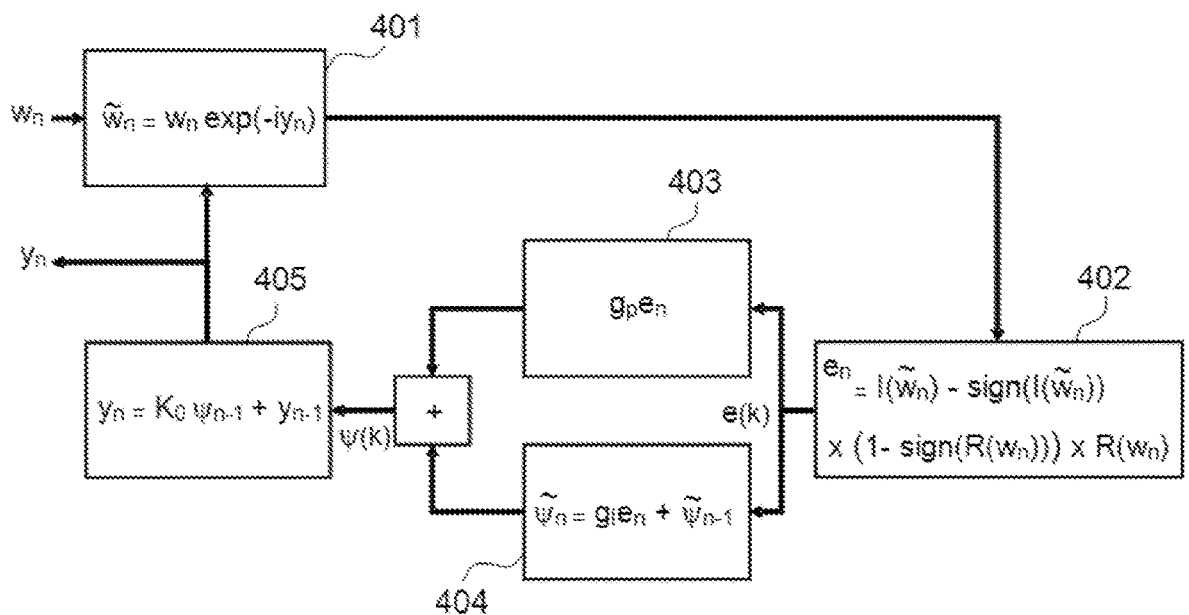
FIG. 4a shows a schematic of a phase-locked loop.

The invention will now be described in the context of an application to standard IEEE 802.15.4z, which is an amendment to standard IEEE 802.15.4. This application is given by way of illustrative and non-limiting example. The invention is applicable to any standard or to any waveform that is compatible with an impulse radio ultra-wideband (IR-UWB) modulation and that meets the conditions illustrated in FIG. 1.

The invention is applicable to IR-UWB communication systems comprising a multi-antenna transmitter (comprising at least two antennas) and a single-antenna receiver.

According to the invention, a plurality of characteristics of the signal received by the receiver are estimated. To do this, the signal is considered to be transmitted in succession by each antenna of the transmitter in time intervals called segments, each segment being separated by a guard interval.

FIG. 1 shows an example of a transmission format for a transmitter having two antennas. The two antennas transmit in succession in the segments S1 and S2 respectively, the latter being separated by guard intervals G1, G2, G3.

FIG. 1 also shows the theoretical curve of the variation as a function of time in the phase of the signal received by the receiver. In each of the segments, the phase of the signal varies linearly with a slope common to all the segments that corresponds to a carrier-frequency offset. All the transmitting antennas are here considered to be driven by the same oscillator. The carrier-frequency offset (CFO) in the received signal is due to the fact that the respective oscillators of the transmitter and of the receiver are not synchronized.

In each segment, the phase has a y-coordinate $\beta_1$, $\beta_2$ at the origin that represents a common reference at a reference time. The difference $\beta_2-\beta_1$ contains information on the phase offsets between the signals originating from the two antennas.

The invention especially aims to estimate the aforementioned phase and frequency offsets. The phase-offset estimation allows phase differences to be computed with a view to deducing therefrom, for example, an initial angle of the signal, i.e. an angular direction of the signal, this allowing the transmitter or receiver to be located.

The invention also allows phase coherence to be preserved, with a view to performing a coherent demodulation of any data transmitted after segments S1, S2, which are dedicated to the frequency and phase estimations.

FIG. 2 schematically shows a plurality of frame configurations according to standard IEEE 802.15.4z. This standard makes provision for a plurality of frame formats comprising a field dedicated to measurement of distance and/or angle of arrival, this field being called STS (Scrambled Timestamp Sequence).

Configuration C0 provides a frame made up of the following elements:

a preamble P consisting of a repetition of a given sequence and is used for the initial time- and frequency-domain synchronization and for detection of the frame, a field SFD (Start of Frame Delimiter), which is a repetition of the same sequence as in the preamble but with a weighting by 1, 0 or −1. This sequence allows detection of the frame to be confirmed and the end of the preamble to be detected.

a field PHR (PHY header), which contains header information, a field PSDU (PHY service data unit), which contains the data from the point of view of the physical layer.

Configuration C1 further comprises an STS field between the SFD field and the PHR header.

Configuration C2 comprises an STS field after the PSDU data.

Configuration C3 contains no PSDU data (nor a PHR header).

Configurations C1, C2 and C3 may be used to implement the invention.

The STS field is formed from segments S1, S2 that are separated by guard intervals G1, G2, G3 in which there is no transmission, as illustrated in FIG. 1.

FIG. 1 shows two segments, but the invention is applicable whatever the number of segments, provided that it is at least equal to 2.

The signal transmitted in a time interval corresponding to a segment S1, S2 is composed of pulses separated by a fixed duration $T_{PRP}$. Each pulse is transmitted with a known complex amplitude $c_n$. Without departing from the context of the invention, the duration between two successive pulses may be variable provided that this duration is known to the receiver.

FIG. 3 shows an example of a sequence of symbols transmitted in one segment. In this example, the symbols are real but they may be complex, in which case there are two channels, I and Q, each channel being modulated in the way shown in FIG. 3.

The symbols transmitted in a segment S1, S2 are thus modulated with an IR-UWB modulation. The typical duration of one pulse is of the order of one nanosecond, and for example equal to 2 ns.

The form of the signal received by a receiver, the signal having been transmitted according to the principles described above by a transmitter having $N_{seg}$ antennas, corresponding to $N_{seg}$ segments, will now be described.

The signal received in baseband z(t) in a segment is defined as follows:

$$z(t) = \exp(2i\pi\Delta ft + i\phi_0) \sum_{k=0}^{N-1} c_k \sum_{v=0}^{N_{path}-1} h_v p(t - kT_{PRP} - \tau_v) + b(t)$$

where:

N is the number of complex symbols per segment, $\phi_0$ is a phase offset between the phase of the local oscillator of the receiver and the phase of the signal transmitted by each antenna. This offset does not incorporate the phase offset due to the propagation time of the signal, $\Delta f$ is a frequency offset between the receiver and transmitter (common to all the antennas), p(t) is the shape of the basic pulse, b(t) is noise the real and imaginary parts of which are assumed to be centred, white, Gaussian and of same variance, $N_{path}$ is the number of paths of the propagation channel, $h_v$ and $\tau_v$ are the complex amplitude of path v of the signal and the delay of path v, respectively.

The impulse response of the channel, h(t), is therefore defined by:

$$h(t) = \sum_{v=0}^{N_{path}-1} h_v \delta(t - \tau_v)$$

Assuming:

$$p_h(t) = \sum_{v=0}^{N_{path}-1} h_v p(t - \tau_v)$$

the following is obtained:

$$z(t) = \exp(2i\pi\Delta ft + i\phi_0) \sum_{k=0}^{N-1} c_k p_h(t - kT_{PRP}) + b(t)$$

The notation may be extended to the entirety of the STS field by considering symbols $c_k$ to be zero in the guard intervals G1, G2, G3 between segments S1, S2.

If a guard interval G1, G2, G3 is considered to have a duration equal to $N_g T_{PRP}$, the $c_N \ldots c_{N+N_g-1}$ symbols "transmitted" during a guard interval following the first segment are zero.

Likewise, if the STS field contains three segments, the $c_{2N+N_g} \ldots c_{2N+2N_g-1}$ symbols of the guard interval between the second and third segments are zero and so on.

The propagation channel varies between the segments since each segment corresponds to a different transmitting antenna. The channel of the segment of index s is denoted $h_s$. It is then possible to write (with $N_{seg}$ the number of segments $T_s = N \times T_{PRP}$ and $T_g = N_g \times T_{PRP}$):

$$z(t) = \exp(2i\pi\Delta ft + i\phi_0) \sum_{s=0}^{N_{seg}-1} \sum_{k=0}^{N-1} c_{k+2(N+N_g)} p_{h_s}(t - kT_{PRP} - s(T_s + T_g)) + b(t)$$

Reception end, this signal is sampled with a sampling period $T_{ech}$ (at a sampling frequency higher than two times the bandwidth) to obtain the discrete signal $z_n$:

$$z_n = z(nT_{ech})$$

A step of time synchronization carried out on the preamble P allows the index $n_0$ corresponding to a particular path (for example the first or strongest path) to be determined for the first pulse of the STS field. If necessary, $n_s$ is determined for each segment s.

The signal $u_n$ is then defined (with $M=N+N_g$ the number of symbols in a segment followed by a guard interval):

$u_n = \exp(2i\pi\Delta f(n_0 T_{ech} + nT_{PRP}) + i\phi_0) \Sigma_{k=0}^{N-1} c_k p_{h_0}(n_0 T_{ech} + (n-k)T_{PRP}) + b_n$ for segment 0

$u_n = \exp(2i\pi\Delta f(n_0 T_{ech} + nT_{PRP}) + i\phi_0) \Sigma_{k=0}^{N-1} c_{k+M} p_{h_1}(n_1 T_{ech} + (n-k-M)T_{PRP}) + b_n$ for segment 1

$u_n=\exp(2i\pi\Delta f(n_{N_{seg}-1}T_{ech}+nT_{PRP})+i\phi_0)\Sigma_{k=0}^{N-1}c_{k+}$
$_{(N_{seg}-1)M}p_{h_{N_s-1}}(n_{N_{seg}-1}T_{ech}+(n-k-(N_{seg}-1)M)$
$T_{PRP})+b_n$ for the last segment 0 between the segments If the time-domain support of the function $p_{h_s}$ is shorter than the duration between two pulses, then the sum on each of the lines disappears leaving only the nth term (no interference between pulses).

Each symbol of the received signal is then multiplied by the complex conjugate of the symbols $c_k$ transmitted in an STS field:

$w_n = u_n \times c^*_n$ $w_n$ is zero in the guard intervals (i.e. for $n \in [\![ N; M-1 ]\!] \cup [\![ N+M; 2M-1 ]\!] \cup \ldots \cup [\![ N+(N_{seg}-2)M; (N_s-1)M-1 ]\!]$).

If there is no inter-pulse interference, only the modulus of the symbols $c_n$ then remains. In the general case, the other terms correspond to inter-pulse interference that may be likened to noise.

Figure 5:
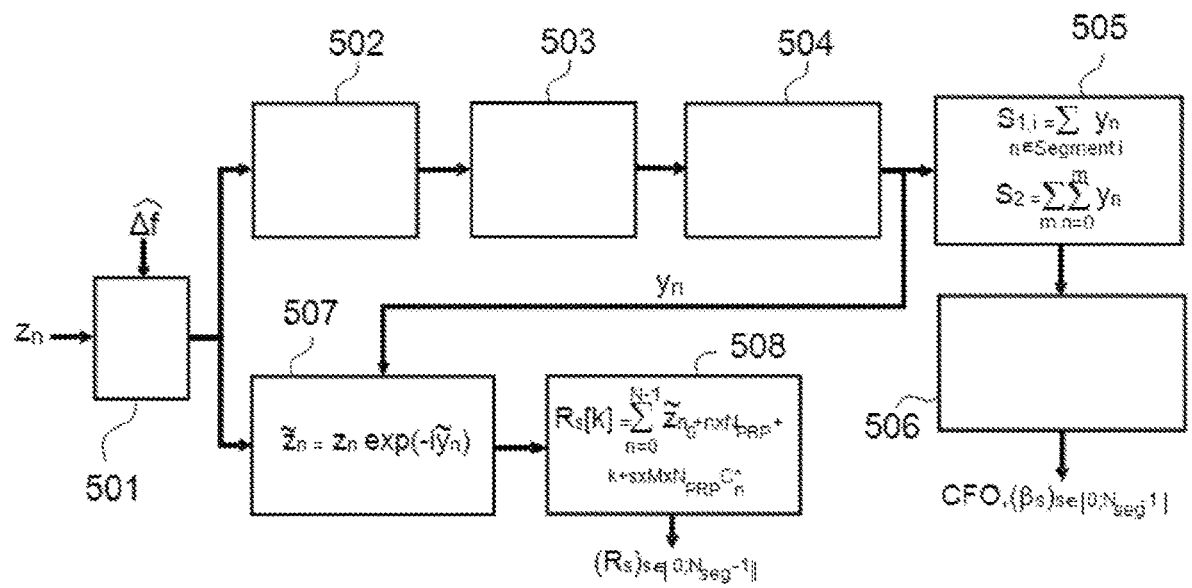
FIG. 5 shows an overview of a method for estimating phase and frequency offsets and for estimating impulse response according to various embodiments of the invention.

The steps of the method according to the invention are illustrated in the schematic in FIG. 5.

In step 501, the signal $z_n$, which has been digitized beforehand, is received and the signal is corrected using an estimation of a sampling frequency offset (SFO). This SFO is obtained in a prior frequency-synchronizing step that is carried out in order to estimate the carrier frequency offset $\Delta f$ between the transmitter and receiver. This carrier frequency offset $\Delta f$ is also referred to by its acronym CFO. The sampling frequency offset is the equivalent, in the time domain, of the carrier frequency offset, which in relative terms has the same value because it is generated by the same transmission-end frequency oscillators. This prior frequency-synchronizing step is carried out on the preamble P of the frame.

In step 502, one of the paths no of the signal is selected on the basis of a prior time synchronization carried out on the preamble P of the frame to determine the start of the STS field. For example, the selected path is the path of highest amplitude. In other words, step 502 consists in selecting the samples of the signal corresponding to the path selected on the basis of the result of the time synchronization.

According to a first embodiment of the invention, this step 502 is common to all the segments. This first embodiment is applicable when the antennas of the transmitter are sufficiently close together for the propagation channels between each transmitting antenna and the receiver to be able to be assumed to be identical.

In step 503, each symbol of the STS field (in other words each symbol of each segment) is multiplied by the complex conjugate of the corresponding transmitted symbol: $w_n = u_n \times c^*_n$.

In step 504, a digital phase-locked loop is applied to the symbols $w_n$ in order to extract the phase of the signal.

One example of a phase-locked loop is illustrated in FIG. 4, and is formed from a plurality of stages.

In stage 401, the symbol $w_n$ is corrected using the last phase estimation $y_n$ output from the loop in the preceding iteration.

In stage 402, the phase $e_n$ of the corrected symbol or a value that varies in the same direction of variation as this phase in at least one predetermined phase interval is computed, for example by means of an arctan computation or of the following simplified computation:

$e_n = I(\widetilde{w_n}) - \text{sign}(\widetilde{w_n}) * (1 - \text{sign}(R(\widetilde{w_n}) * R(\widetilde{w_n}))$ I and R designate the imaginary part and the real part of the symbol, respectively.

Figure 4B:
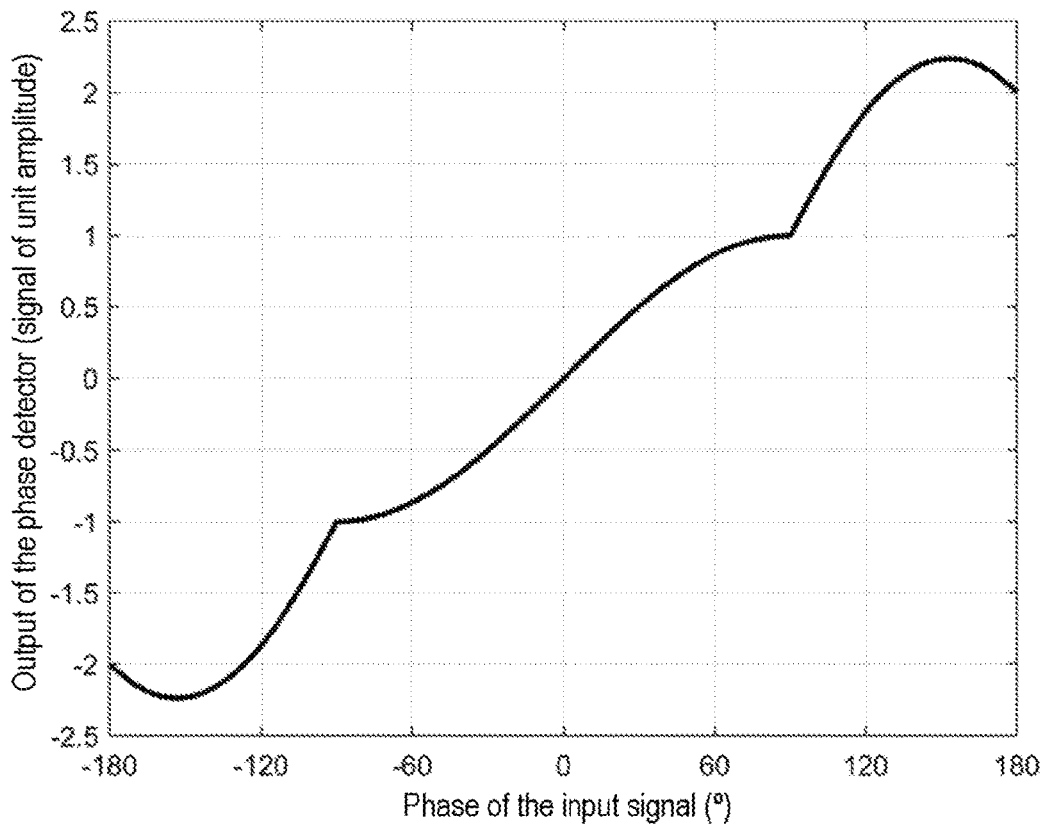
FIG. 4b shows a graph of the variation in a phase error.

FIG. 4b illustrates one example of the phase variation $e_n$, such as computed via the aforementioned formula.

In stage 403, a proportional filter, i.e. a gain $g_p$, is applied to the error $e_n$.

In stage 404, an integration filter is applied to the error $e_n$, this filter for example performing the computation $\widetilde{\psi_n} = g_1 e_n + \widetilde{\psi_{n-1}}$.

The outputs of the two filters 403, 404 are summed so as to achieve a proportional-integral system.

In stage 405, a loop filter is lastly applied in order to deliver the final estimate of the phase $y_n = K_0 \Psi_{n-1} + y_{n-1}$.

Other means may be used to realize a phase-locked loop without departing from the scope of the invention. In particular, other types of filters may be employed.

Below, the rest of the steps of the method illustrated in FIG. 5 will now be described.

In step 505, the phases $y_n$ computed for all the symbols of all the segments are input into a linear-regression step 505 that aims to determine the slope at and the y-coordinates of the origin of the straight lines illustrated in FIG. 1.

In other words, the parameters $\alpha$ and $\beta = [\beta_0 \ldots \beta_{N_s-1}]^T$ are sought that minimize the function:

$f(\alpha, \beta) = \Sigma_{s=0}^{N_{seg}-1} \Sigma_{n=sM}^{sM+N-1} (y_n - \alpha n - \beta_s)^2$ This optimization problem may be solved using a numerical algorithm. One example of one way in which this problem may be solved will now be described.

Differentiating with respect to each of the parameters:

$$\frac{\partial f}{\partial \alpha} = -2 \sum_{s=0}^{N_{seg}-1} \sum_{n=sM}^{sM+N-1} n(y_n - \alpha n - \beta_s)$$

$$\frac{\partial f}{\partial \beta_s} = -2 \sum_{n=sM}^{sM+N-1} (y_n - \alpha n - \beta_s) \text{ for } s \in [\![ 0, N_{seg}-1 ]\!].$$

$S_{1,s}$ is defined as the summation of the symbols $y_n$ in segment s:

$S_{1,s} = \Sigma_{n=sM}^{sM+N-1} y_n$ $S_2$ is defined as the double summation of all the symbols $y_n$ including the symbols of the guard intervals:

$S_2 = \Sigma_{m=0}^{(N_{seg}-1)M+N-1} \Sigma_{n=0}^{m} y_n$

It is thus possible to write:

$S_2 = \Sigma_{n=0}^{(N_{seg}-1)M+N-1} ((N_{seg}-1)M+N-n) y_n = ((N_{seg}-1)M+N) \Sigma_{s=0}^{N_{seg}-1} S_{1,s} - \Sigma_{n=0}^{(N_{seg}-1)M+N-1} n y_n$ Solution of the following system $$\frac{\partial f}{\partial \alpha} = 0$$

$$\frac{\partial f}{\partial \beta_s} = 0 \text{ for } s \in [\![ 0, N_{seg}-1 ]\!]$$

then yields the following results:

$$\alpha = \frac{6}{N_{seg}} \frac{(N+1)S_{1,N_s-1} + (2M+N+1)S_{1,N_s-2} + \ldots + (2(N_{seg}-1)M+N+1)S_{1,0} - 2S_2}{N(N+1)(N-1)}$$

$$\beta_0 = \frac{S_{1,0}}{N} - \frac{\alpha}{2}(N-1)$$

$$\beta_1 = \frac{S_{1,1}}{N} - \frac{\alpha}{2}(2M+N-1)$$

$$\beta_s = \frac{S_{1,s}}{N} - \frac{\alpha}{2}(2sM + N - 1)$$

$$\beta_{N_{seg}-1} = \frac{S_{1,N_s-1}}{N} - \frac{\alpha}{2}(2(N_{seg}-1)M + N + 1)$$

The complexity of the computations to obtain these values is low. For example, in a case with two segments the following is obtained:

$$\alpha = 3\frac{(N+1)S_{1,1} + (2M+N+1)S_{1,0} - 2S_2}{N(N+1)(N-1)}$$

$$\beta_1 = \frac{S_{1,0}}{N} - \frac{\alpha}{2}(N-1)$$

$$\beta_2 = \frac{S_{1,1}}{N} - \frac{\alpha}{2}(2M + N - 1)$$

The units of the parameters $\beta_s$ are the same as the units of the symbols $y_n$. Thus, the values of the parameters $\beta_s$ provide estimations of the respective phase offsets between the signals transmitted by each antenna and the received signal.

The slope $\alpha$ is an estimation of the term $2\pi\Delta f T_{PRP}$ and therefore allows an estimation of the term $\Delta f$ which is the carrier frequency offset between the received signal and the transmitted signal, to be obtained.

The estimated frequency and phase offsets are thus computed in step 506. In particular, computation of the differences $\beta_j - \beta_i$ provides the phase offsets, reception end, between signals transmitted by two different antennas.

Figure 6:
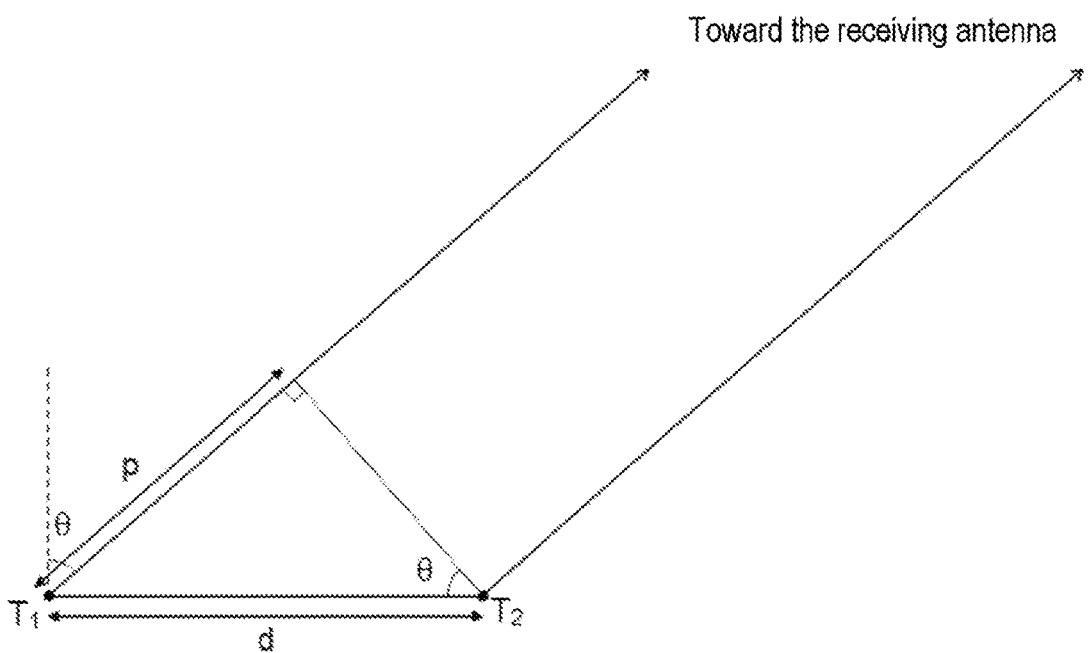
FIG. 6 shows a schematic illustrating a step of determining a transmission angle.

On the basis of the phase differences $\beta_j - \beta_i$, an additional step (not shown in FIG. 5) allows the transmission direction of the signal to be determined according to the geometric principles illustrated in FIG. 6.

FIG. 6 schematically shows two antennas $T_1$, $T_2$ separated by a distance d and transmitting a signal in a transmission direction $\theta$.

By geometry, with the notations of FIG. 6, it is true to write:

$$p = d \sin(\theta)$$

Denoting the difference between the phase offsets estimated in step 506 $\delta$ (i.e. $\beta_2 - \beta_1$ converted into radians) and the wavelength $\lambda$, since the phase difference is caused by the difference in path length from the antenna $T_1$ to the receiver and from the antenna $T_2$ to the receiver, the following is obtained:

$$\delta = \frac{2\pi}{\lambda} p$$

The equality is modulo $2\pi$ and there is no ambiguity if $p/\lambda < 0.5$ and therefore if $d < \lambda/2$ (because $p \leq d$ in every possible situation).

The following relationship between the phase difference $\delta$ on arrival and the starting angle $\theta$ is deduced therefrom:

$$\theta = \arcsin\left(\frac{\delta\lambda}{2\pi d}\right)$$

If $d \geq \lambda/2$, other solutions are obtained by adding multiples of $2\pi$ to $\delta$.

Figure 7:
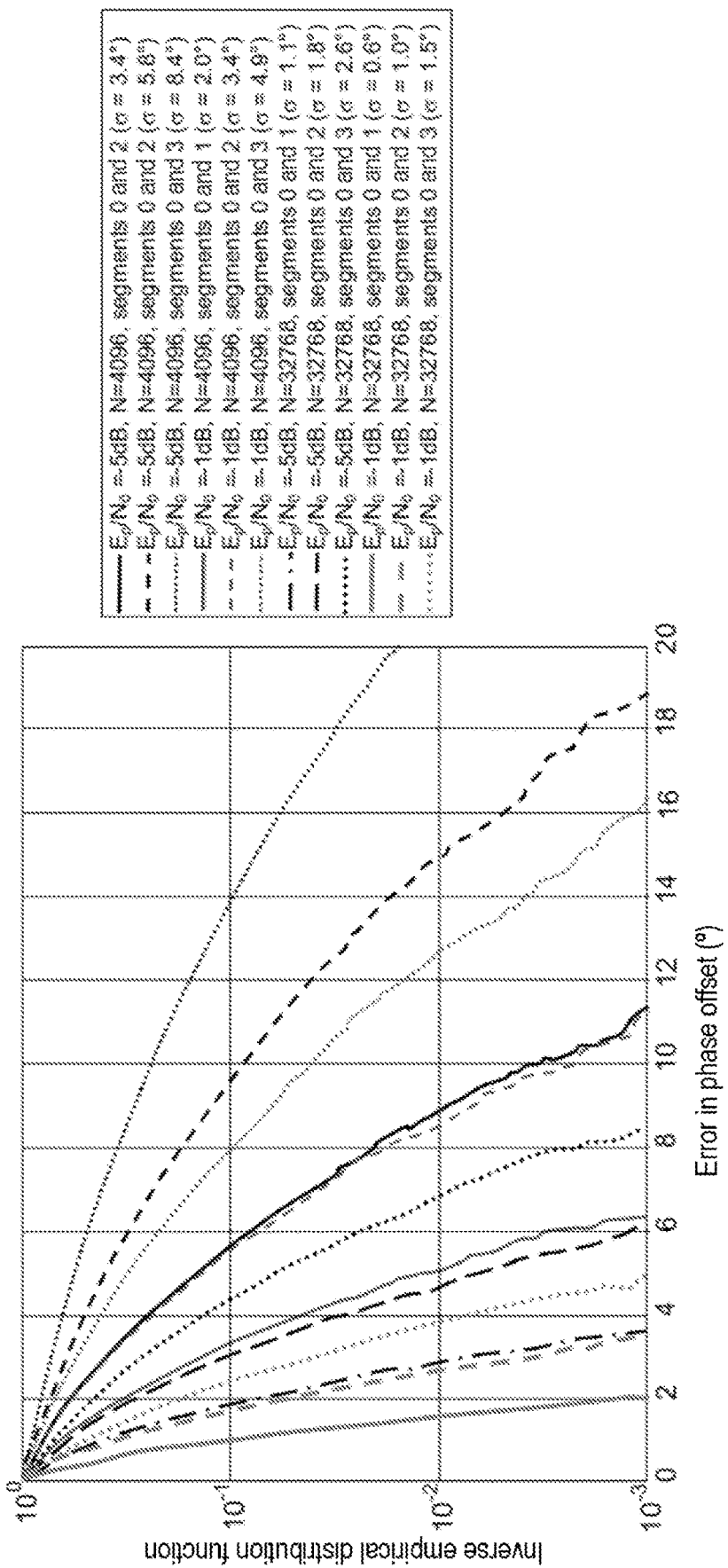
FIG. 7 shows a graph of the results of the performance of the method according to the invention as a function of various signal-to-noise ratios and of the transmission configuration of the signal.

FIG. 7 shows a graph of the performance (obtained by simulation) of the method according to the invention.

Each simulation was carried out with the following parameters:
- number of pulses per segment: N=4096 or N=32768
- number of segments: $N_{seg}$=4
- signal-to-noise ratio, which is given by the energy per pulse divided by the spectral power density of the noise: $E_p/N_0$=−5 dB or $E_p/N_0$=−1 dB
- carrier frequency offset (CFO)=400 kHz.

One entire frame in configuration 1 was simulated. The initial synchronization was carried out on the preamble of the packet by correlating the received signal and the known preamble sequence. The preamble sequence (which is defined by the standard IEEE 802.15.4z) has an autocorrelation of zero when the sequences are not aligned, and therefore it is thus possible to obtain both an estimation of the impulse response of the channel and a time synchronization. Thus, the aforementioned index $n_0$ may be determined.

It is assumed that the antennas are separated by less than one half-wavelength, and therefore that the offsets in arrival time between antennas are less than 143 ps (for a central frequency of 3.5 GHz); therefore, it is possible to consider the synchronization time $n_0$ to remain constant (the sampling period $T_{ech}$ being of the order of 500 ps).

The step of synchronizing with the preamble also allows the carrier frequency offset to be estimated (for example by watching the variation in phase between two correlation peaks). The symbol rate is also subject to an offset between the transmitter and the receiver (SFO) but as the various frequencies originate from the same oscillator (receiver side and transmitter side) the relative CFO and SFO offsets are identical in this example.

The performance obtained by simulation is shown in FIG. 7. The signal-to-noise ratio of −5 dB corresponds to a very good sensitivity for a receiver compatible with standard IEEE 802.15.4z.

The x-axis represents the error (in absolute value) in the estimation of the phase offset between two antennas corresponding to two segments, which segments are identified in the legend, and the y-axis represents the ratio of estimates that have an error higher than the x-axis value (inverse empirical distribution function). The standard deviation $\sigma$ of the error has also been given in the legend.

In one variant of embodiment of the invention, the additional steps 507 and 508 of FIG. 5 are applied to reconstruct the impulse response of the transmission channel.

To do this, in step 507, the phase information delivered by the phase-locked loop 504 is used to correct the received signal:

$$\widetilde{z_n} = z_n \cdot \exp(-i\widetilde{y_n})$$

$\widetilde{y_n}$ is obtained by oversampling the phase estimate $y_n$ delivered by the phase-locked loop 504. Specifically, the phase estimates $y_n$ are delivered at the rate of one sample per pulse period and it is necessary to get back to the rate at which the signal $z_n$ is sampled.

Next, in step 508, the impulse response of the channel is estimated by carrying out an intercorrelation between the symbols corrected in step 507 and the corresponding transmitted symbols $c^*_n$:

$$R_s[k] = \sum_{n=0}^{N-1} \widetilde{z}_{n_0 + n \times N_{PRP} + k + s \times M \times N_{PRP}} \times c^*_n$$

The impulse response $R_s$ is determined for each segment with k lying in a predetermined range of sample-index values that depends on the desired extent of the impulse response.

The method illustrated in FIG. 5 assumes that the propagation channel does not vary or varies little as a function of the transmitting antennas, because these antennas are sufficiently close to one another.

Figure 8:
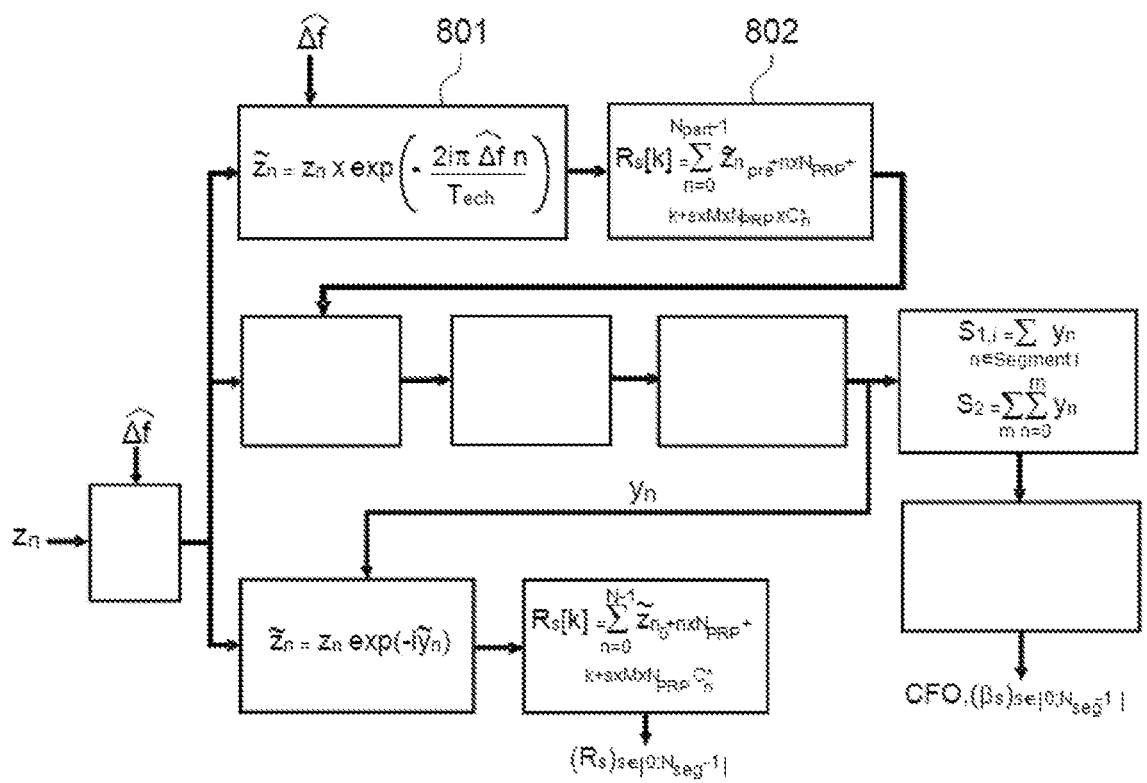
FIG. 8 shows an overview of a variant of the method according to the invention.

In the case where this assumption is not met, for example because the antennas are far apart, a variant of embodiment of the invention is proposed, which variant is such as illustrated in FIG. 8. In this variant, the time no corresponding to the start of the STS field and determined by prior time synchronization is no longer considered to be identical for each segment.

This new variant of embodiment, which is illustrated in FIG. 8, contains two additional steps 801, 802 in addition to steps 501 to 508 of FIG. 5.

In the general case where the response of the channel varies substantially between the antennas, synchronization must be repeated to determine indices $n_i$ for each segment.

Starting with the received signal $z_n$, after step 501 and via step 801, the CFO $\widehat{\Delta f}$ obtained during the synchronization with the preamble P is compensated for in order to obtain the corrected signal $\tilde{z}_n$:

$$\tilde{z}_n = z_n \times \exp\left(-i\frac{2\pi \widehat{\Delta f} n}{T_{ech}}\right)$$

It will be noted that if the frequency offset between the transmitter and the receiver is small enough, i.e. if the rotation of the phase is sufficiently small with respect to $\pi$ over the correlation length that will be employed for the synchronization in step 802, by virtue of the precision of the oscillators, the compensation carried out in step 801 is not required.

Next, in step 802, an intercorrelation computation is carried out to determine the impulse response of the propagation channel in segment s.

This estimation 802 is carried out, on the start of each segment, in order to estimate the channel corresponding to each transmitting antenna. As above, it is assumed here that all the antennas have the same CFO with the receiver (this is the case if the antennas all form part of the same device and are fed in turn by the same signal source).

In addition, the synchronization with the preamble makes it possible to determine in which window the first pulse of each STS field is located, given that the distance between the antenna that transmitted the preamble and the antenna that transmitted the segment in question is known. If this distance is called d, the pulse (with respect to the one that would have been transmitted if the antenna had not changed) will be offset by at most $\pm d/c$, where c is the propagation speed of the wave.

For the start of each segment, step 802 then aims to compute the intercorrelation between the symbols corrected in step 801 and the transmitted symbols (same principle as step 508).

$$R_s[k] = \sum_{n=0}^{N_{part}-1} \tilde{z}_{n_{pre}+n \times N_{PRP}+k+s \times M \times N_{PRP}} \times c^*_n$$

The response $R_s[k]$ is computed for k such that the set of all the k includes at least the interval $[\![-d/(c \times T_{ech})]; [d/(c \times T_{ech})]]\!]$, where $n_{pre}$ is the position index that the first pulse of the STS field would have had if it had been transmitted with the antenna that transmitted the preamble with which this value $n_{pre}$ was estimated, $N_{PRP}$ is the number of samples per period, and $N_{part}$ is the number of pulses in each segment of the STS field on which the synchronization was performed (this number is chosen depending on the targeted sensitivity).

The chosen criterion is then applied to determine the synchronization times $n_s$ for each segment s—for example, if the strongest path is chosen:

$$n_s = \underset{k}{\mathrm{argmax}}(|R_s[k]|) + n_{pre}$$

Once the times $n_s$ have been determined, the same processing operations as previously (above $n_s = n_{pre}$), namely steps 501 to 508 described before, are applied.

In the case where the invention is applied to configuration C1 of the standard IEEE 802.15.4z, i.e. when the STS field is located between the SFD field and the PHR field, it is necessary to be able to start coherently demodulating data at the start of the PHR field.

This assumes that the symbols are aligned in phase. The antenna that transmits the PHR header is the same one that transmits the preamble and the SFD field; therefore, it is necessary to be able to compensate for phase variations (mainly due to the CFO) that occur during the time interval corresponding to the STS field. To achieve this, the invention makes use of the phase tracking performed in the STS field and then removes the phase jumps caused by the changes of antenna.

Figure 9:
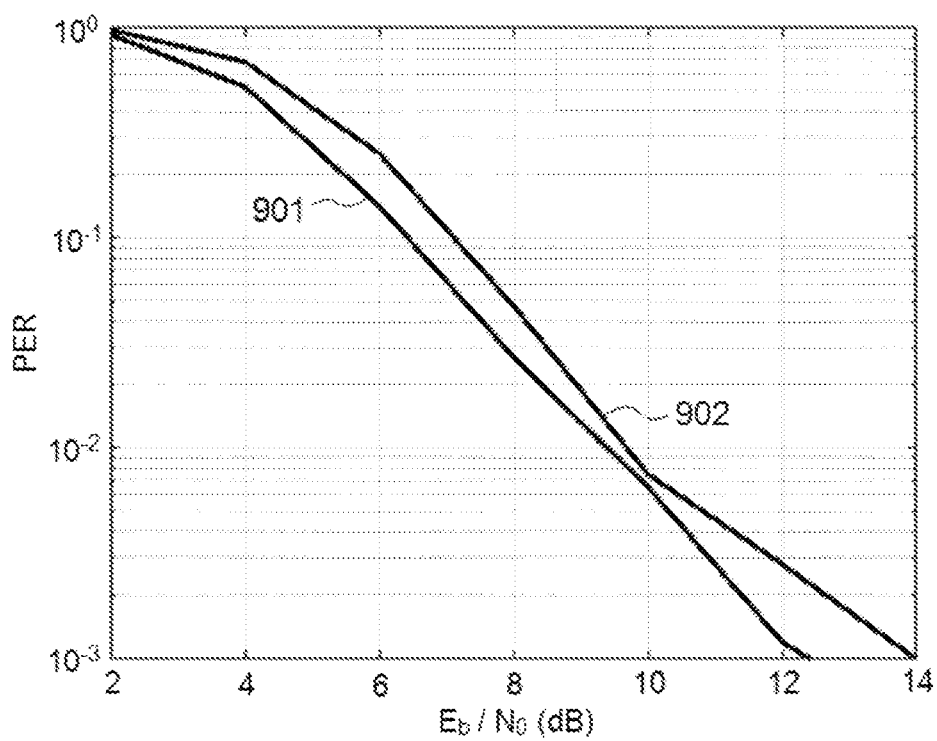
FIG. 9 shows a comparative graph of the performance of the method according to the invention.

The invention thus ensures a good performance, as illustrated in FIG. 9, which shows two curves of packet error rates as a function of a signal-to-noise ratio without the presence of an STS field and therefore without the invention (curve 901) and in a configuration C2 in which the invention was implemented on STS fields present in the transmitted frames, respectively.

The following are the conditions under which the simulation illustrated in FIG. 9 was carried out:

When the STS field was present (curve 902)
number of pulses per segment: N=32768
number of segments: $N_{seg}$=4
the propagation channel was of residential type.
there were 8 pulses per bit, and therefore it was necessary to subtract 9 dB to obtain a pulse signal-to-noise ratio $E_p/N_0$ from the bit signal-to-noise ratio $E_b/N_0$
the CFO was equal to 400 kHz
$N_{part}$=1024 pulses were dedicated to the initial synchronization.

FIG. 9 shows that, for a given packet error rate (PER), a loss limited to 0.5 dB is observed when the invention is applied (curve 902) with respect to an ideal case (901).

The invention may be implemented by means of an ultra-wideband receiver REC that comprises an antenna ANT-R1, a reception and digitization channel NUM and a computer CALC that is configured to execute the steps of the method according to the invention. Such a receiver is schematically shown in FIG. 10.

The computer CALC may be produced in the form of software and/or hardware, notably using one or more processors and one or more memories. The processor may be a generic processor, a specific processor, an application-specific integrated circuit (ASIC) or a field-programmable gate array (FPGA).

Figure 10:
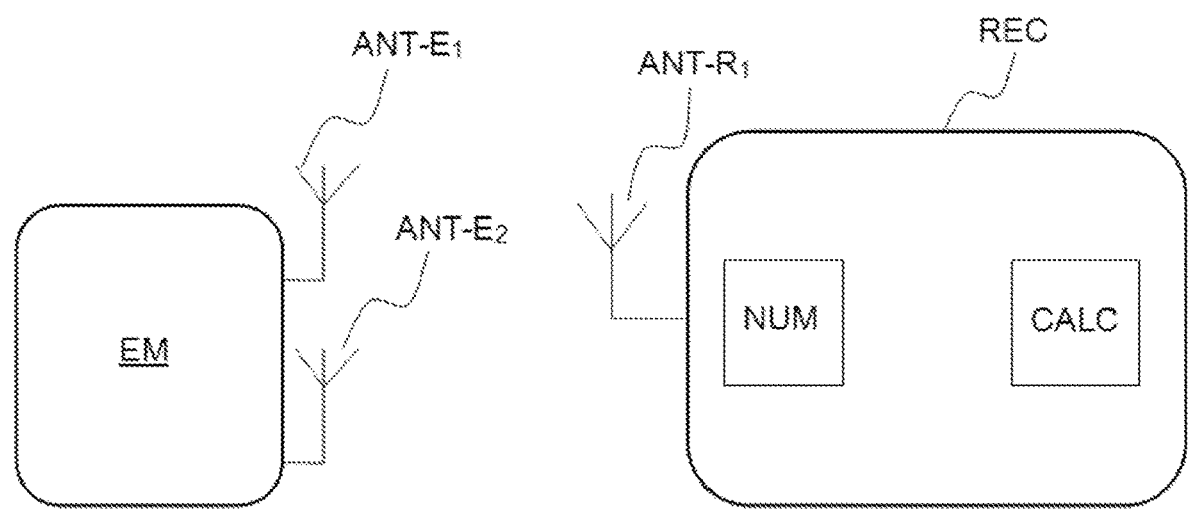
FIG. 10 shows a simplified schematic of a communication system according to the invention.

More broadly, the invention may be implemented within an ultra-wideband communication system, such as illustrated in FIG. 10, comprising a receiver REC of the type described above and at least one ultra-wideband transmitter EM having at least two transmitting antennas ANT-E1, ANT-E2.

The invention is compatible with the standard IEEE 802.15.4z or any other standard that i) employs IR-UWB modulation, ii) makes provision in the format of the transmission frames for segments to be dedicated to each transmitting antenna and iii) employs symbols known to the transmitter and receiver (pilot symbols for example).

Advantageously, the sequences of symbols used in the provided segments are secured by means of a cryptography or encryption algorithm, so as to secure access thereto so that only the transmitter and receiver may access these sequences.

For example, a symmetric AES encryption protocol may be implemented between the transmitter and the receiver of the system to exchange beforehand the values of the sequences used in the segments.

The invention especially makes it possible to assist with radiolocation and with secure access control by allowing a transmitter to be located on the basis of its angular direction of transmission.

The invention claimed is:

1. A method for estimating at least one characteristic of a signal received by a receiver, the signal having been transmitted in succession by a plurality of antennas in successive time segments (S1, S2), each segment (S1, S2) being dedicated to one separate antenna, the signal being modulated into the form of pulses according to ultra-wideband modulation, the method comprising steps of:
    receiving and digitizing said signal,
    computing a product of multiplication of each symbol of the received signal by a complex conjugate of the corresponding transmitted symbol,
    for each segment and for each symbol of the signal received for said segment, estimating a phase error by means of a phase-locked loop applied to said product,
    for each segment, determining a reference phase by means of a linear regression applied to the phase errors estimated for all of the segments,
    determining, for at least one pair of antennas, a phase difference between the signals transmitted by the antennas of the pair, on the basis of the difference between the reference phases computed for the segments associated with said antennas.

2. The estimating method according to claim 1, further comprising, conjointly with the determination of the phase difference, determining a carrier frequency offset between the signal transmitted by all of the antennas and the received signal by means of said linear regression applied to the phase errors estimated for all of the segments.

3. The estimating method according to claim 1, wherein the successive time segments (S1, S2) are separated by guard intervals (G1, G2, G3) and the method further comprises removing these guard intervals from the received and digitized signal.

4. The estimating method according to claim 1, further comprising a step of determining an angular direction of transmission of the signal on the basis of said phase differences.

5. The estimating method according to claim 1, further comprising steps of:
    correcting each symbol of the received signal for the computed phase error by means of the phase-locked loop,
    estimating an impulse response of the propagation channel by means of a computation of an intercorrelation between the sequence of the corrected received symbols and a sequence of the symbols transmitted in the segments.

6. The estimating method according to claim 1, comprising beforehand an initial synchronizing phase specific to each segment comprising steps of:
    determining, in a preamble sequence prior to the first segment, a first estimation of a carrier frequency offset between the received signal and the digitized signal,
    correcting the digitized received signal using this first estimation,
    estimating, for the start of each segment, an impulse response of the propagation channel by means of a computation of an intercorrelation between a sequence of corrected received symbols and a sequence of the corresponding transmitted symbols,
    determining, on the basis of the impulse response estimated for the start of each segment, a symbol corresponding to the start of the segment.

7. The estimating method according to claim 1, wherein the sequences of symbols transmitted in the time segments are secured by means of an encryption algorithm.

8. A receiver of a signal modulated into the form of pulses according to ultra-wideband modulation, said receiver comprising an antenna and a computer configured to execute the steps of the method for estimating at least one characteristic of the received signal according to claim 1.

9. A communication system comprising a transmitter of a signal modulated into the form of pulses according to ultra-wideband modulation comprising a plurality of antennas, the signal being transmitted in succession by a plurality of antennas in successive time segments, each segment being dedicated to one separate antenna, the system further comprising a receiver according to claim 8.

* * * * *